(12) United States Patent
Roberts et al.

(10) Patent No.: US 9,173,001 B1
(45) Date of Patent: Oct. 27, 2015

(54) MEDIA CONTENT ACCESS SYSTEMS AND METHODS

(75) Inventors: Brian Roberts, Frisco, TX (US); Heath Stallings, Grapevine, TX (US); Don Relyea, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1262 days.

(21) Appl. No.: 11/474,992

(22) Filed: Jun. 27, 2006

(51) Int. Cl.
*G06F 3/00* (2006.01)
*G06F 13/00* (2006.01)
*H04N 5/445* (2011.01)
*H04N 21/4722* (2011.01)
*H04N 21/4725* (2011.01)
*H04N 21/478* (2011.01)

(52) U.S. Cl.
CPC ....... *H04N 21/4722* (2013.01); *H04N 5/44582* (2013.01); *H04N 21/4725* (2013.01); *H04N 21/47815* (2013.01)

(58) Field of Classification Search
USPC .................. 725/47, 60, 68, 85, 100, 139, 151
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |

(Continued)

*Primary Examiner* — Yassin Alata

(57) ABSTRACT

In one of many possible embodiments, a system includes a media content processing subsystem configured to process a flagging request, which designates a scene within the media content instance as a flagged scene. The processing subsystem is further configured to generate an actionable data module containing additional content corresponding to the flagged scene.

25 Claims, 14 Drawing Sheets

(56) References Cited

U.S. PATENT DOCUMENTS

| | | |
|---|---|---|
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,637,028 B1 * | 10/2003 | Voyticky et al. ................ 725/42 |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 7,039,935 B2 | 5/2006 | Knudson et al. |
| 7,069,576 B1 | 6/2006 | Knudson et al. |
| 7,487,529 B1 | 2/2009 | Orlick |
| 7,503,059 B1 * | 3/2009 | Rothschild ..................... 725/113 |
| 7,849,131 B2 * | 12/2010 | Van De Sluis ................ 709/203 |
| 2001/0021916 A1 * | 9/2001 | Takai ............................... 705/14 |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0015801 A1 * | 1/2005 | Hososda et al. ................ 725/38 |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0160458 A1 * | 7/2005 | Baumgartner ................ 725/46 |
| 2005/0216936 A1 | 9/2005 | Knudson et al. |
| 2005/0251824 A1 | 11/2005 | Thomas et al. |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |

* cited by examiner

MEDIA CONTENT ACCESS SYSTEMS AND METHODS

FEDERAL FUNDING STATEMENT

This invention was made with United States government support awarded by the Office of Naval Research, contract number: N00014-97-C-0395. The United States has certain rights in this invention.

BACKGROUND INFORMATION

The advent of computers, interactive electronic communication, the Internet, and other advances in the digital realm of consumer electronics have resulted in a great variety of programming, recording, and viewing options for users who view media content such as television programs. In implementing such enhanced programming, the set-top box (STB) has become an important computing device for accessing media content services and the media content within those services. In addition to supporting traditional analog broadcast video functionality, STBs also support an increasing number of two-way digital services such as video-on-demand, internet protocol television (IPTV), and personal video recording.

An STB is typically connected to a cable or satellite, or generally, a subscriber television system, and includes hardware and software necessary to provide the functionality of the subscriber television system at a user site. Conventional STBs include a processor, communication components, and memory and are connected to a television or other display device, such as a personal computer. While many STBs are stand-alone devices that are externally connected to a television, an STB and/or its functionality may be integrated into a television or personal computer or even into an audio device such as a programmable radio, as is known.

An STB is usually configured to provide users with a large number and variety of media content choices. For example, a user may choose to view a variety of television programs, pay-per-view services, video-on-demand programming, Internet services, and audio programming via an STB.

As mentioned, an STB may also include a personal video recording (PVR) application that allows a user to temporarily and/or permanently record selected media content to a storage device. Such recording functionality enables a user to view media content in "trick play," or non-linear, modes. Trick play modes include, but are not limited to, slow motion, fast motion, reverse play, fast forward play, instant replay, jumping, pausing of live broadcast, and scanning. To facilitate trick play modes, the media content is buffered or stored in a temporary memory buffer, often called a live cache buffer, so that it may be replayed non-linearly.

The ability to buffer live broadcasts has had a significant impact on the advertising industry. In the past, the basic business model for broadcast television programming has been free or low cost distribution of media content, subsidized by the insertion of commercials. However, PVRs allow users to easily skip many of these commercials.

In response, advertisers have been forced to turn to other methods of marketing their products. For example, some advertisers have entered into "product placement" agreements with media content creators, where products are purposely included as part of the programming. Although product placement provides exposure to products, its effect is limited by the inability to include detailed descriptions of the products and/or discussion of the benefits of the products. Moreover, product placement does not provide interested viewers with the ability to access additional information regarding the products.

Other advertising techniques intended to target PVR users have also proven ineffective or undesirable. Accordingly, current advertising techniques are generally incapable of effectively reaching PVR users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Preferred exemplary systems and methods for facilitating access to additional content corresponding to a scene within a media content instance are described herein. As used herein, the term "media content instance" will be used to refer generally to any television program, on demand program, pay-per-view program, broadcast media program, commercial, advertisement, video, movie, song, photograph, or any segment of these or other forms of media content that may be experienced or viewed by a user.

The exemplary systems and methods described herein enable a user to flag or otherwise designate a particular scene within a media content instance (e.g., a television program) and then access additional content related to the flagged scene. The additional content may include, but is not limited to, videos, photographs, program information, information corresponding to one or more products displayed in the flagged scene, purchasing options corresponding to one or more of the products displayed in the flagged scene, one or more links to web content, recording options, one or more key words corresponding to the flagged scene, and/or advertiser information.

In certain embodiments, a media content processing subsystem, such as a set-top box (STB), is configured to process a flagging request and generate an actionable data module corresponding to a scene that is flagged by a user. The actionable data module includes additional content related to the flagged scene and/or one or more links to additional content related to the flagged scene. The media content processing subsystem may be configured to periodically update the actionable data module with additional content that becomes available on a network of which the processing subsystem is a part. The user may then access the additional content included within and/or referenced by the actionable data module by using one or more user interfaces such as graphical user interfaces (GUIs).

The systems and methods described herein may be used to supply media content consumers with additional content that may not be accessible via traditional television programming. For example, the systems and methods described herein may facilitate more effective product placement and advertising. Moreover, the systems and methods may be used by a media content provider to customize viewing options for a particular user and to generate advertising revenue. Users also benefit from the systems and methods described herein by being able to easily access additional content that is related to a particular media content instance or scene thereof.

Components and functions of exemplary embodiments of media content access systems and methods will now be described in more detail.

II. Exemplary System View

Figure 1:
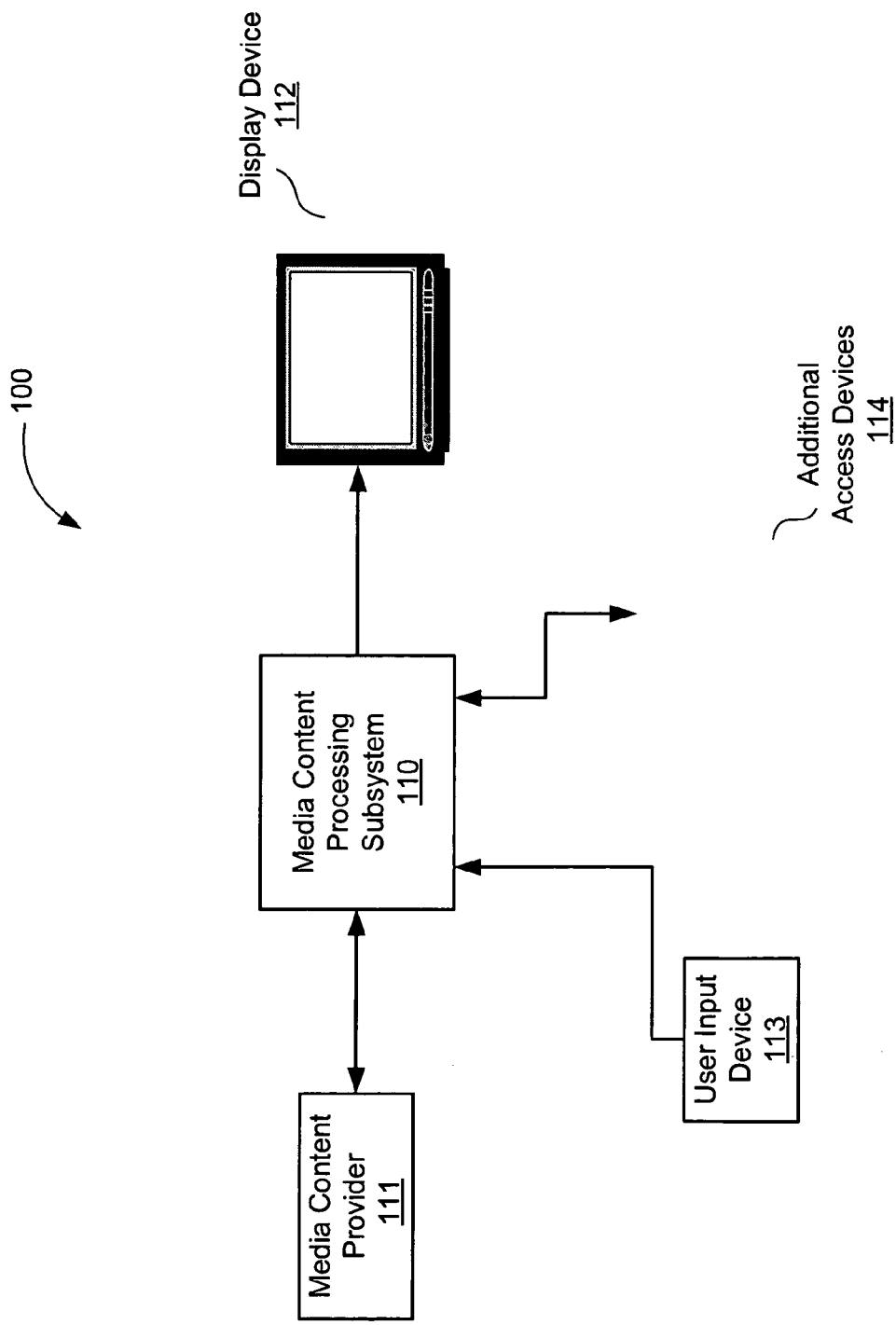
FIG. 1 illustrates an example of a media content access system, according to an embodiment.

FIG. 1 illustrates an example of a media content access system 100, according to one embodiment. Media content access system may take many different forms and include multiple and/or alternate components and facilities. Examples of such multiple/alternate components and facilities are reflected in commonly-assigned patent applications entitled "Enhanced Content Access Systems and Methods" to Roberts, et al. (Ser. No. 11/474,995), and entitled "Snippet Access Systems and Methods" to Roberts, et al. (Ser. No. 11/747,991), each of which being filed on the same day as the present application, and each of which incorporated herein by reference in their respective entireties.

As shown in FIG. 1, a media content processing subsystem 110 is configured to communicate with and receive a data stream (i.e., a media content stream) containing a media content instance from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), telnet, Hypertext Transfer Protocol ("HTTP"), socket connections, Ethernet, and other suitable communications networks and technologies.

The media content processing subsystem 110 is configured to process the media content stream provided by the media content provider 111 and provide a signal to a display device 112 so that the display device 112 may display the media content. As will be described in more detail below, the media content processing subsystem 110 may be controlled by a user input device 113 and/or a number of additional access devices 114.

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider

Media content provider 111 is configured to provide various types of media content via a satellite, cable system, subscriber television network, the Internet, optical fiber network, wireless network, or any other suitable network. The media content may include, but is not limited to, television programs, pay-per-view services, video-on-demand programming, Internet services, DVD content, and audio programming.

Figure 2:
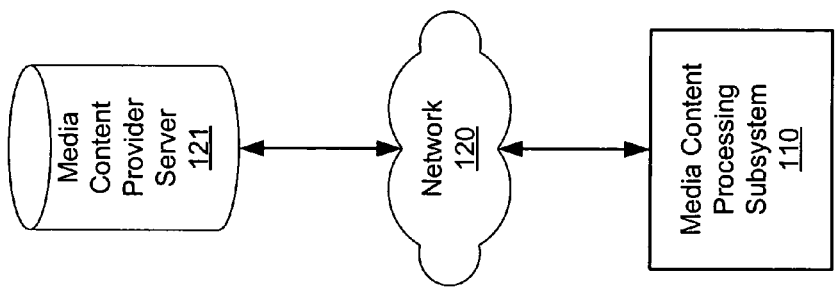
FIG. 2 is an illustration of an exemplary media content provider network, according to an embodiment.

An exemplary media content provider 111 includes a media content provider server 121, as shown in FIG. 2. The media content provider server 121 may be configured to communicate with the media content processing subsystem 110 via one or more types of networks 120 (and communications links thereto). The network 120 shown in FIG. 2 may include the Internet, an intranet or other private packet-switched network, a cable television network (e.g., hybrid fiber-coax network), a wireless broadcast network (e.g., a satellite media broadcasting network or terrestrial broadcasting network), a telephone network, a provider-specific network (e.g., a Verizon® FIOS® network and/or a TiVo® network), an optical fiber network, or any other suitable network. In some alternative examples, the processing subsystem 110 may be connected directly to the media content provider server 121.

B. Display Device

As mentioned, the processing subsystem 110 may be coupled to a display device 112 configured to display or play the media content. The display device 112 may include, but is not limited to, a television, computer monitor, handheld device, or any other device configured to display or play the media content.

C. Media Content Processing Subsystem

Figure 3:
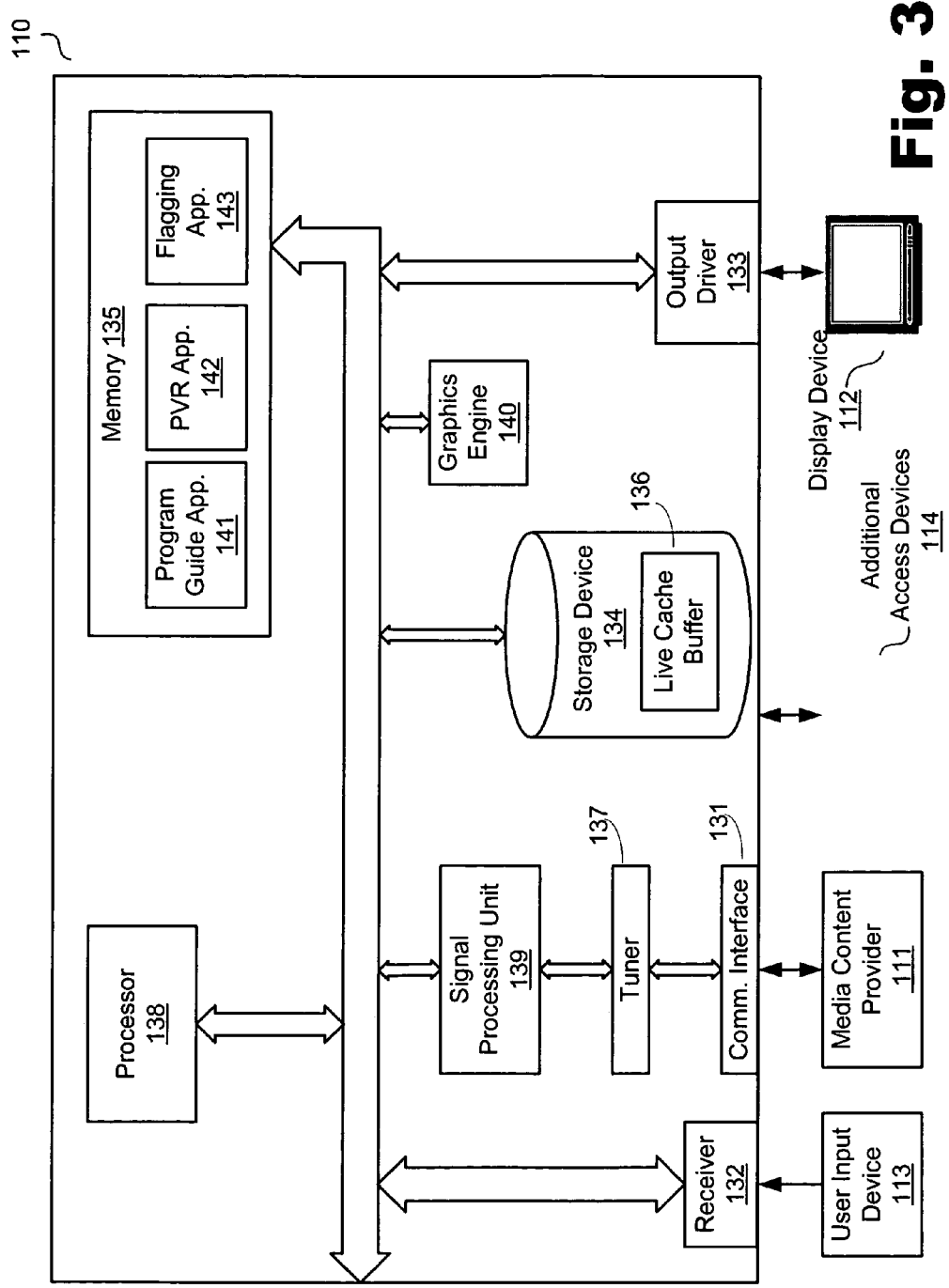
FIG. 3 is a block diagram of an exemplary media content processing subsystem, according to an embodiment.

FIG. 3 is a block diagram of an exemplary media content processing subsystem 110 (or simply "processing subsystem 110") according to an exemplary embodiment. The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible receivers that receive and decode digital and/or analog media content. Hence, an exemplary processing subsystem 110 may include, but is not limited to, a set-top box (STB), home communication terminal (HCT), digital home communication terminal (DHCT), stand-alone personal video recorder (PVR), digital video disc (DVD) player, video-enabled phone, and personal computer.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the Unix operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface 131 configured to receive media content from the media content provider 111. The processing subsystem 110 may also include a receiver 132 configured to receive input commands from a user input device 113. The user input device 113 may include, for example, a remote control, keyboard, or any other suitable input device and may be configured to communicate with the receiver 132 via an IR link, electrical connection, or any other suitable communication link.

Figure 4:
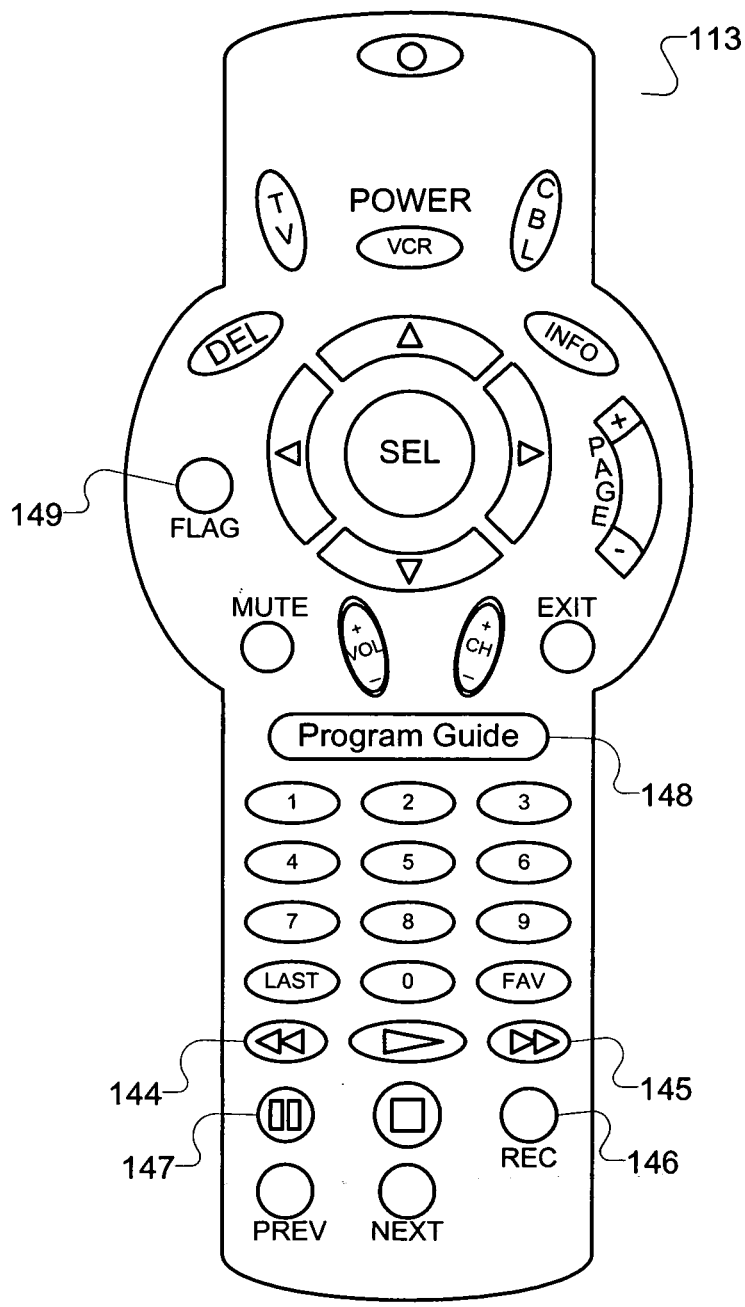
FIG. 4 illustrates an exemplary remote control user input device, according to an embodiment.

An exemplary remote control user input device 113 is illustrated in FIG. 4. In some examples, the input device 113 may be configured to enable a user to control viewing options of the media content. For example, rewind 144 and fast-forward buttons 145 enable a user to access different scenes or frames within media content stored in a live cache buffer 136. A record button 146 may also be included which enables the user to designate as permanently recorded any media content instance buffered in the live cache buffer 136. A pause button 147 may enable the user to pause a media content instance. A program guide button 148 may be configured to evoke the display of a program guide on the display device 112.

A flag button 149, as will be described in more detail below, may also be included to provide the user with the ability to flag a particular scene of media content being displayed on the display device 112. It will be recognized that the input device 113 shown in FIG. 4 is merely illustrative of the many different types of user input devices that may be used in connection with the present systems and methods.

Returning to FIG. 3, a number of additional access devices 114 may also be configured to communicate with the processing subsystem 110. These access devices 114 may include, but are not limited to, personal computers and mobile devices (e.g., laptops, personal digital assistants (PDAs), cellular phones, etc.). In some examples, as will be described in more detail below, the access devices 114 may be configured to access content stored and/or processed by the processing subsystem 110. For example, media content that has been recorded by the processing subsystem 110 may be accessed and viewed on a personal computer. Moreover, the additional access devices 114 may be used to program or otherwise control the functions of the processing subsystem 110.

The processing subsystem 110 may also include an output driver 133 configured to interface with or drive the display device 112. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. As will be described in more detail below, various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory (RAM), dynamic RAM (DRAM), or a combination thereof. In some examples, as will be described in more detail below, various applications (e.g., a PVR application) used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. As will be described in more detail below, media content data may be temporarily stored in the live cache buffer 136 to facilitate viewing of the media content in one or more trick play modes.

3. Tuner

Tuner 137 is configured to tune to a particular television channel, stream, address, frequency or other carrier in order to process media content that is transmitted on that carrier. In some examples, the tuner 137 may include multiple tuners such that multiple carriers of media content may be processed and/or shown on a display device 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether it is to be deleted. As used herein, the term "permanent recording" will be understood to mean media content that is stored for an extended period of time as decided by the user.

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

The processing subsystem 110 may also include a graphics engine 140 configured to generate graphics that are to be displayed by the display device 112. The graphics may include graphical user interfaces (GUIs) such as, but not limited to, a program guide, a progress bar, and other graphics.

5. Application Clients

Returning to FIG. 3, one or more applications 141-143 residing within the processing subsystem 110 may be executed upon initiation by a user of the processing subsystem 110. The applications 141-143, or application clients, may reside in memory 135 or in any other area of the processing subsystem 110 and be executed by the processor 138.

As shown in FIG. 3, one of the applications may be a program guide application 141 configured to generate a program guide that is displayed on the display device 112. An exemplary program guide includes a graphical user interface (GUI) that performs various functions including allowing a user to select and view program information associated with various media content instances.

The processing subsystem 110 may also include a personal video recording (PVR) application 142. A PVR application is also referred to as a digital video recording (DVR) application. As used herein and in the appended claims, unless otherwise specifically denoted, the term "PVR application" will be used to refer to any application or device configured to record media content and/or provide for the viewing of media content in trick play mode. As previously mentioned, trick play modes include, but are not limited to, slow motion, fast motion, reverse play, fast forward play, instant replay, jumping, pausing of live broadcast, and scanning. The PVR application 142 may also provide for media content recording functionality by enabling the temporary and/or permanent recording of media content to the storage device 134.

In some examples, the PVR application 142 may be integrated into the processing subsystem 110, as shown in FIG. 3, or it may be a stand-alone unit. A stand-alone PVR may be coupled to the processing subsystem 110 or it may be used in place of the processing subsystem 110. In the examples contained herein, it will be assumed that the PVR application 142 is integrated into the processing subsystem 110 for illustrative purposes only.

Figure 5:
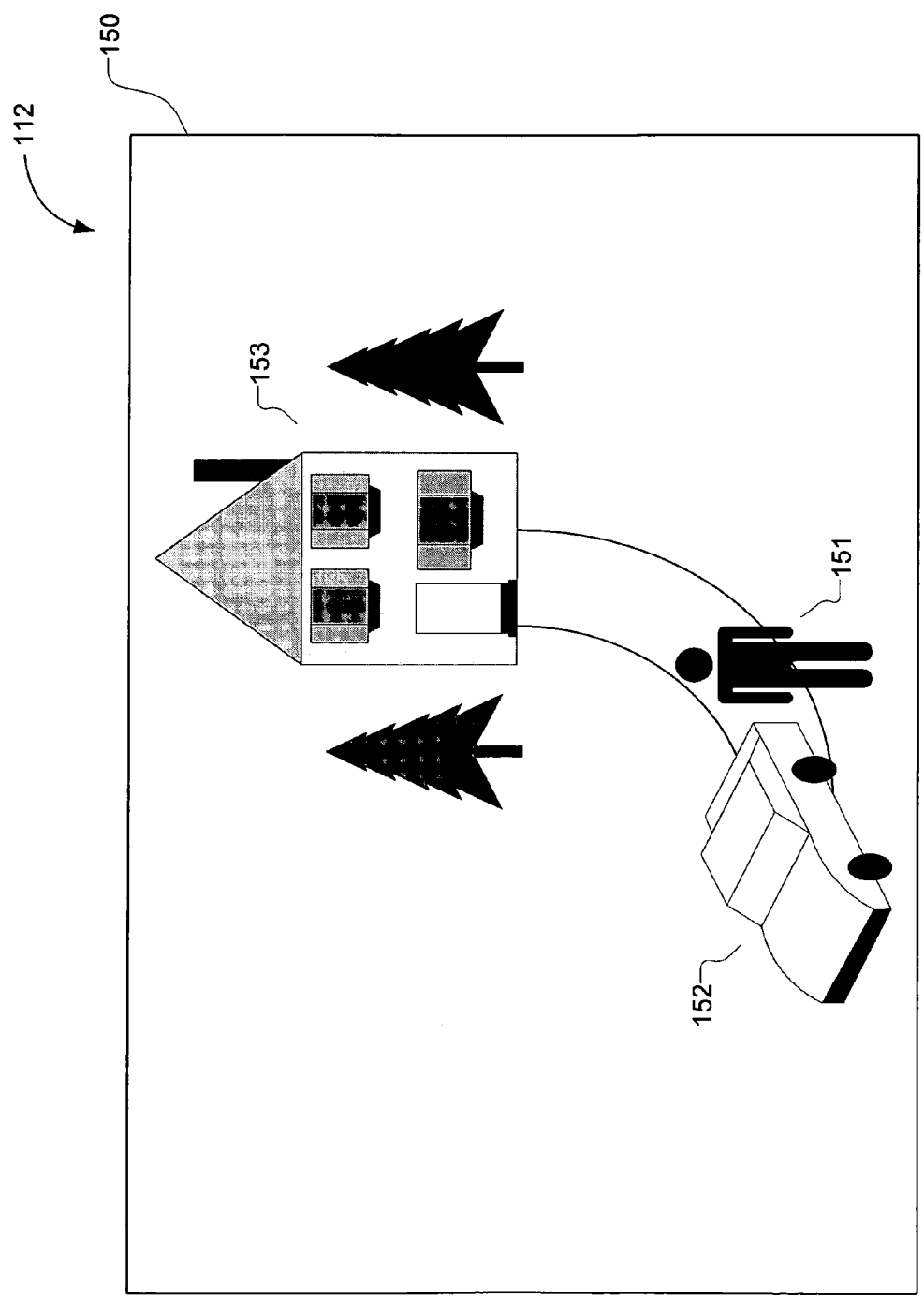
FIG. 5 illustrates a viewing screen of an exemplary display device with a particular scene or frame of media content displayed thereon, according to an embodiment.

The processing system 110 may also include a flagging application 143, which may be used by a user of the processing subsystem 110 to "flag" or otherwise designate a particular media content scene in order to access additional content and/or functionality related to that scene. To facilitate an understanding of the flagging application 143, an exemplary media content scene is shown in FIG. 5. FIG. 5 illustrates a viewing screen 150 of an exemplary display device 112 with a particular scene or frame of media content displayed thereon. In some instances, the user may be interested in viewing additional or enhanced content related to the particular media content scene being displayed. As used herein and in the appended claims, unless otherwise specifically denoted, the terms "additional content" and "enhanced content" will be used interchangeably to refer to media content, information, and/or functionality related to a particular media content scene being displayed.

For example, with reference to the media content scene shown in FIG. 5, the additional or enhanced content may include, but is not limited to, biographical information related to a character 151, advertising information related to a product (e.g., the automobile 152 and/or building 153), and/or any other information or content related to the media content scene being displayed such as, but not limited to, photographs, videos, outtakes, bonus content, etc.

Accordingly, in some embodiments, a user may use the flagging application 143 to "flag" or otherwise designate a particular media content scene in order to access additional content related to that scene. For example, the user may flag the scene shown in FIG. 5 to access additional content related to any of the objects shown therein.

Figure 6:
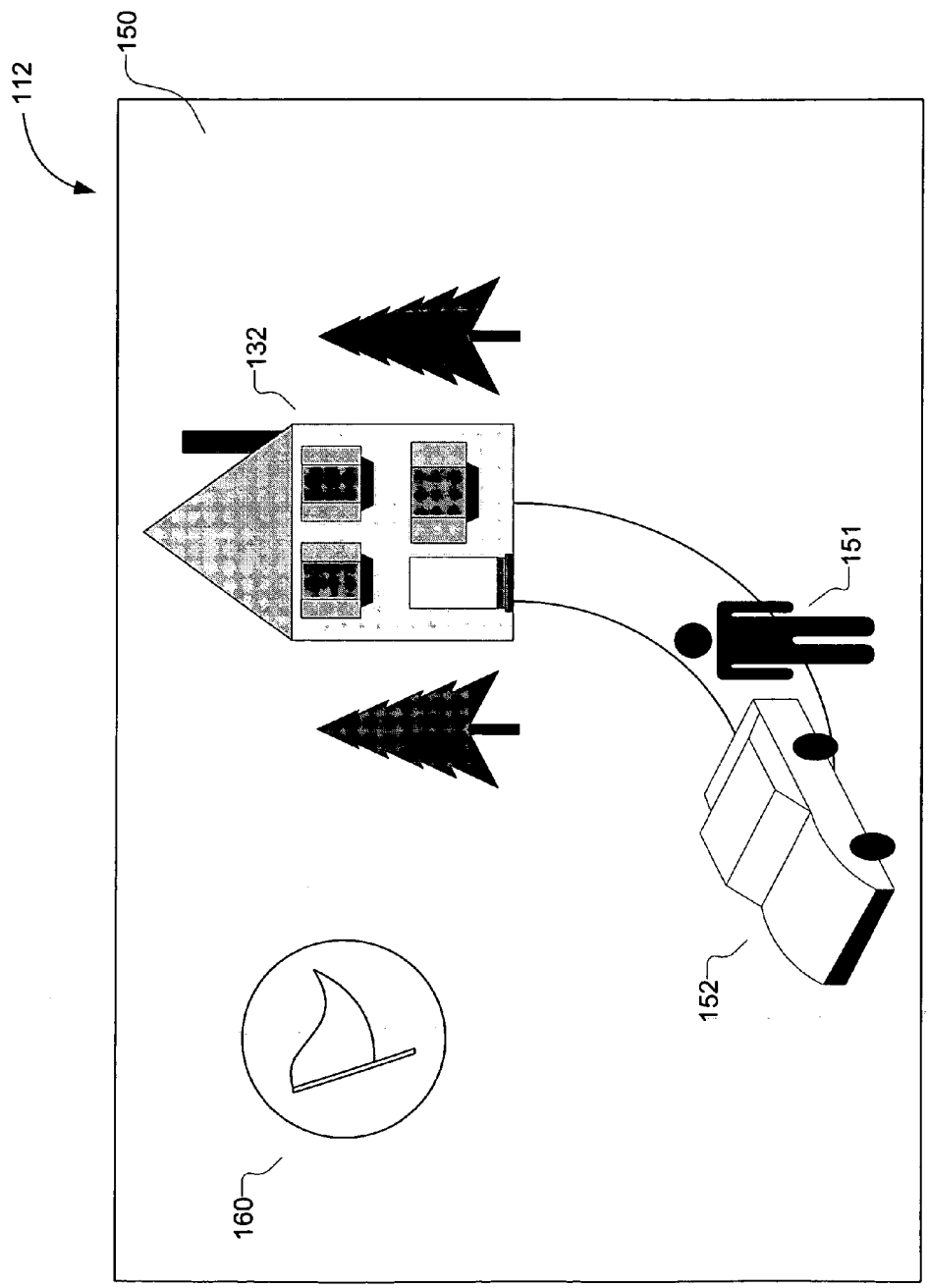
FIG. 6 illustrates a flagged media content scene, according to an embodiment.

FIG. 6 illustrates a flagged media content scene. In particular, FIG. 6 shows the media content scene of FIG. 5 as flagged. As shown in FIG. 6, any suitable graphic 160 (e.g., a picture of a flag) may be displayed on the screen 150 of the display device 112 to indicate to the user that the scene has been flagged. It will be recognized that the graphic 160 may be configured to only temporarily be displayed on the screen 150 of the display device 112 so as to not interrupt the viewing experience of the user.

In some examples, the user may flag a particular scene being shown simply by pressing a button that may be included on the input device 113. For example, the user may press the flag button 149 shown on the user input device 113 of FIG. 4. It will be recognized that additional or alternative methods may be used to flag a media content scene.

6. Actionable Data Module

In some embodiments, an actionable data module is automatically created by the processing subsystem 110 when a user flags a particular media content scene. As used herein, the term "actionable data module" will be used to describe a software entity containing additional content and/or links to additional content related to a flagged scene of media content.

Figure 7:
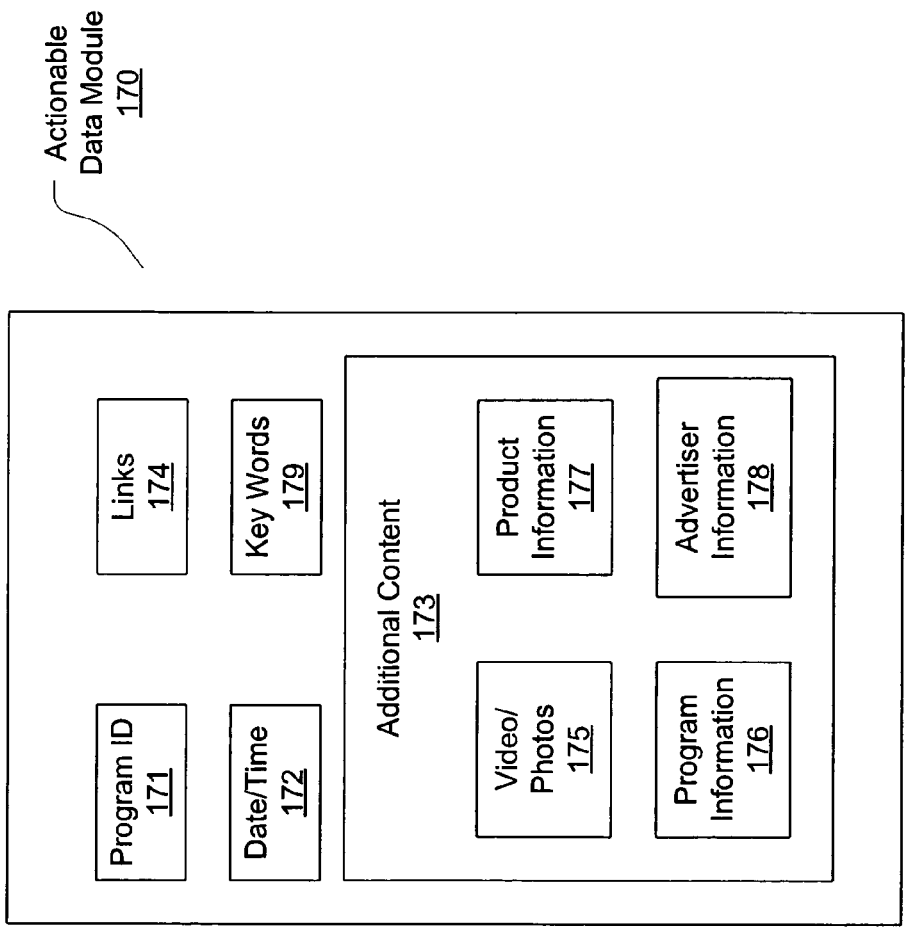
FIG. 7 is a block diagram illustrating the contents of an exemplary actionable data module, according to an embodiment.

FIG. 7 is a block diagram illustrating the contents of an exemplary actionable data module 170 that is created when a user flags a particular media content scene. It will be recognized that the contents of the actionable data module 170 shown in FIG. 7 are merely illustrative and that they may be modified, added to, or removed as may serve a particular application.

As shown in FIG. 7, the actionable data module 170 may include a program identification (ID) 171 associated with the media content of which the flagged scene is a part. In some examples, the program ID 171 is included within the incoming media content stream provided by the media content provider 111. The program ID 171 may be used to locate additional content associated with the media content of which the flagged scene is a part on the network 120 or on the media content provider server 121.

The actionable data module 170 may also include a date and time stamp 172 corresponding to the date and time that the media content scene is flagged. In this manner, as will be described in more detail below, the corresponding flagged scene may be stored and/or organized by date and time.

Additional content 173 corresponding to the flagged scene may also be included within the actionable data module 170. It will be recognized that in some instances, some or all of the additional content 173 is included entirely within the actionable data module 170 (e.g., when the additional content 173 includes text). Alternatively, pointers or links to storage locations of additional content 173 stored within the processing subsystem 110 are included within the actionable data module 170 (e.g., when the additional content 173 includes videos and/or photographs).

In certain embodiments, the actionable data module 170 may include one or more links 174 to additional content that is remotely located on the media content server 121 or at some other location on the network 120 (e.g., a web page on the Internet). The links 174 may include hyperlinks, uniform resource locators (URLs), addresses, or any other type of networking link and may be configured to provide a user with access to additional content that is remotely located on the media content server 121 or network 120.

The additional content 173 may include any type of media content and/or information related to the flagged media content scene. For example, as shown in FIG. 7, the additional content 173 may include additional video and/or photographs 175, information 176 related to the program of which the flagged scene is a part, information 177 related to one or more products shown in the flagged scene, advertiser information 178, and/or any other type of media content or information.

Exemplary video and/or photographs 175 include, but are not limited to, cast photographs, alternative program endings, director's cuts, etc. Exemplary program information 176 includes, but is not limited to, cast biographies, plot synopses, etc.

Exemplary product information 177 includes, but is not limited to, commercials for the products shown in the scene, links to websites associated with the products shown in the scene, and/or purchasing options for the products shown in the scene. Exemplary advertiser information 178 includes, but is not limited to, information about and/or advertisements for sponsors of the media content. The product information 177 and advertiser information 178 will be described in more detail below.

In some examples, the additional content 173 is included within the incoming media content stream provided by the media content provider 111. Additionally or alternatively, the additional content 173 may be located remotely at the media content provider server 121 or at some other site accessible via the network 120. In these instances, the processing subsystem 110 may be configured to download the remotely located content. Alternatively, network addresses corresponding to remotely located additional content are included within the actionable data module 170.

As shown in FIG. 7, the actionable data module 170 may also include one or more key words 179 that are associated with the flagged scene. In some examples, the key words 179 are included within the incoming media content stream provided by the media content provider 111. Additionally or alternatively, the user may input one or more of the key words 179 into the actionable data module 170. As will be described in more detail below, the key words 179 may be used to give the user access to additional content associated with those key words 179, link the user with other users who flag media content having the same key words 179, and automatically record other media content instances having the same key words 179 associated therewith.

In some embodiments, the actionable data module 170 is created initially with data contained within the media content stream of which the flagged scene is a part. For example, markups may be provided within the media content stream that identify products within the flagged scene and/or describe any other additional content associated with the flagged scene. The markups may be associated with the entire media content (e.g., an entire television program) or with one or more scenes within the media content.

In some alternative embodiments, the processing subsystem 110 is configured to transmit the program ID and/or data and time stamp of the flagged scene to the media content provider server 121. The media content provider server 121 may then generate the actionable data module 170 based on the provided information and transmit the actionable data module 170 back to the processing subsystem 110.

In instances where the actionable data module 170 is created locally by the processing subsystem 110, the processing subsystem 110 may additionally be configured to update the contents of the actionable data module 170 with content stored on the media content provider server 121 and/or with content stored at other locations within the network 120. In doing so, large files, such as photographs and video, may be pinged for latency and excluded from the actionable data module 170 if their latency does not meet predefined transmission standards of the particular network being used. Accordingly, the system 100 is able to provide access to additional content while complying with quality of service levels associated with service level agreements. The predefined transmission standards may be defined based on the quality of service levels associated with service level agreements.

After the actionable data module 170 is created and stored within the processing subsystem 110, the processing subsystem 110 may periodically make calls to the network 120 to update the contents of the actionable data module 170 with additional content that becomes available on the network 120 and/or media content provider server 121 over time. For example, the processing subsystem 110 may be configured to update the contents of the actionable data module 170 on a daily or weekly basis. Additionally or alternatively, the processing subsystem 110 may be configured to update the contents of the actionable data module 170 when the user attempts to access a flagged scene that has already been stored.

Accordingly, in some examples, the actionable data module 170 remains active and is continuously updated with additional content until the flagged scene is deleted by the user.

In some examples, a user preference database located on the processing subsystem 110, media content provider server 121, or at any other location stores some minimal information derived from the actionable data module 170 even after the actionable data module 170 and its associated flagged scene are deleted by the user. This information may include, for example, tracking information that may be used for historical, advertising, and learning purposes. For example, the tracking information may be used by one of the applications of the processing subsystem to automatically recommend media content to the user. In some embodiments, the user may select an option that prevents the user preference database from recording such tracking information.

The actionable data module 170 may be created using any suitable programming schema. For example, the actionable data module 170 may be created using an extensible markup language (XML) schema such as, but not limited to, Rich Site Summary (RSS). Once the actionable data module 170 has been created, it may then be stored within the storage device 134 or memory 135, for example, so that it may be accessed at a later time by the user.

D. Graphical User Interfaces

Figure 8:
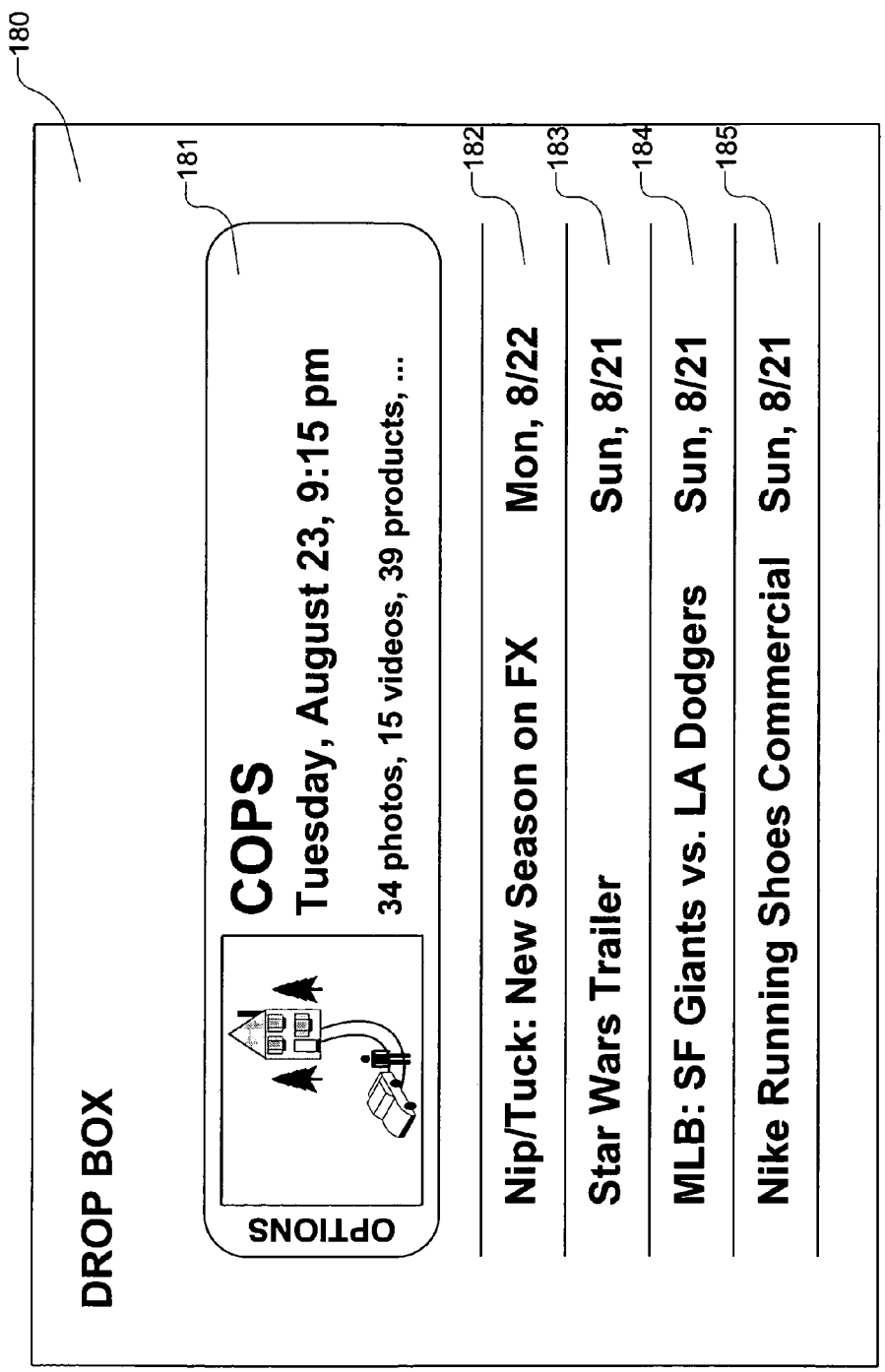
FIG. 8 illustrates an exemplary graphical user interface (GUI) that may be used to provide access to a flagged scene and its corresponding actionable data module, according to an embodiment.

In some examples, the processing subsystem 110 is configured to generate one or more graphical user interfaces (GUIs) that are configured to provide access to a flagged scene and its corresponding actionable data module 170. For example, FIG. 8 illustrates an exemplary GUI 180 that may be used to provide access to a flagged scene and its corresponding actionable data module 170. The GUI 180 shown in FIG. 8 is a user drop box for illustrative purposes only. It will be recognized that any other type of GUI may be used to provide a user with access to a flagged scene and its corresponding actionable data module 170.

As illustrated in FIG. 8, the GUI 180 shows a listing of a number of flagged media content scenes that are currently stored on the processing subsystem 110. For example, the GUI 180 shows that most recently stored scene 181 was flagged on Tuesday, August 23 at 9:15 p.m. and that it was flagged from the television program "COPS." The GUI 180 shows that four other scenes 182-185 have also been flagged by the user.

The GUI 180 may be configured to display any pertinent information about the flagged scene as may serve a particular application. For example, in addition to title and date information, the GUI 180 may be configured to show a summary of the additional content corresponding to one or more of the flagged scenes. For example, the GUI 180 shows that the additional content related to the flagged COPS scene includes 34 photos, 15 videos, and information regarding 39 different products.

Figure 9:
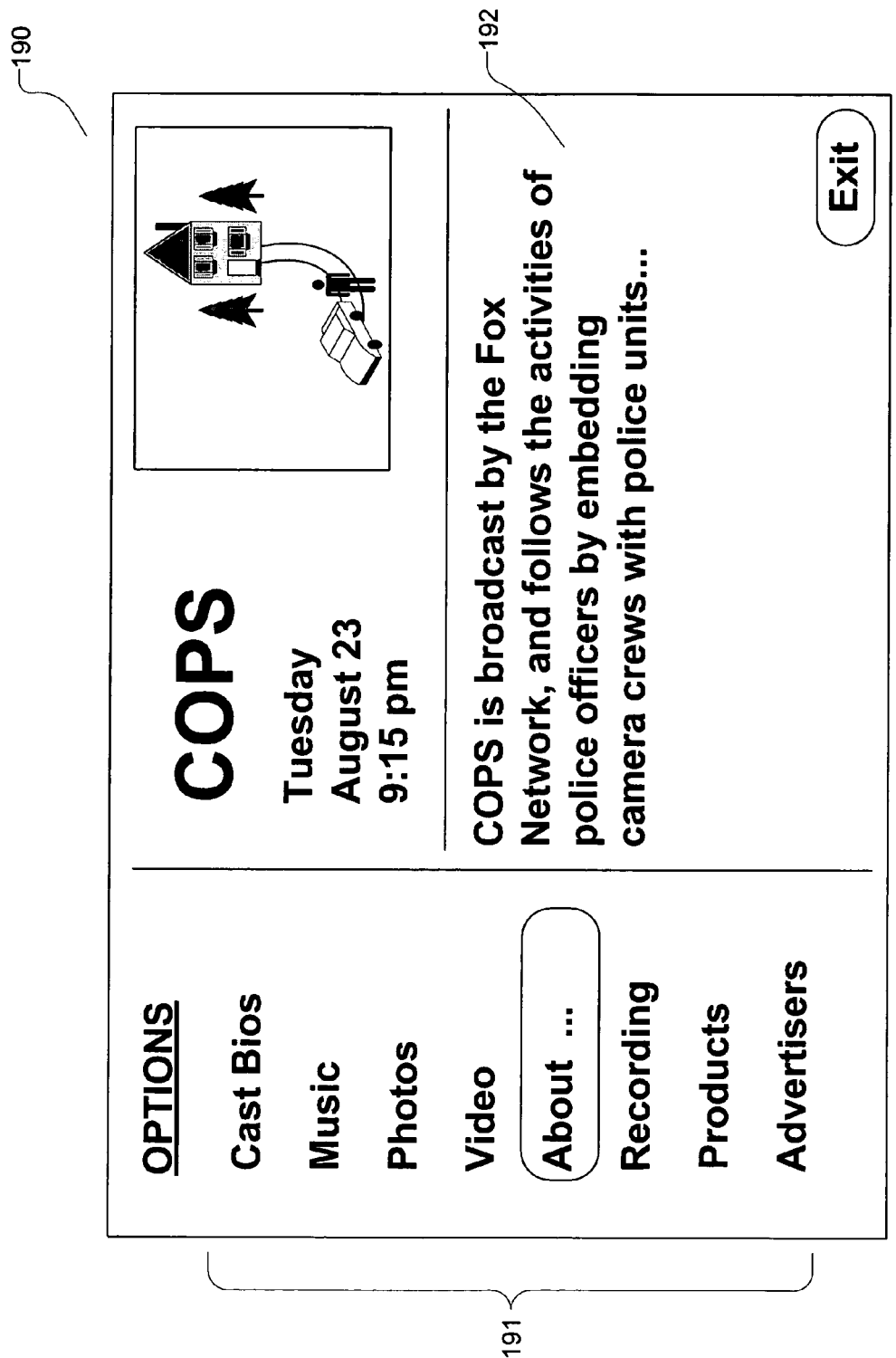
FIG. 9 shows a GUI that may appear on the screen of the display device when a particular flagged scene is selected from the GUI of FIG. 8, according to an embodiment.

In some examples, a user may select one of the flagged scenes in the drop box 180 to view additional content associated therewith. For example, the user may select the flagged COPS scene 181 to view additional content associated with that scene. FIG. 9 shows a GUI 190 that may appear on the screen of the display device 112 when the COPS scene 181 is selected. As shown in FIG. 9, the GUI 190 includes a number of interactive options 191 related to the flagged scene. Exemplary options 191 include, but are not limited to, access to cast biographies, music, photos, video, program information, recording options, product information, and advertiser information. A number of these options will be described in more detail below.

1. Program Information

In some instances, the user may desire to access information about the media content of which the flagged scene is a part. This information may include, but is not limited to, a program synopsis, biographies of the cast of the program, alternative program endings, related photographs and/or video, and/or any other type of information.

For example, to view a program synopsis, the user may select the "about" link under the options menu shown in FIG. 9. Upon selecting this link, a program synopsis 192 appears on the screen. It will be recognized that other information about the media content may be similarly accessed.

2. Product and Advertiser Information

Figure 10:
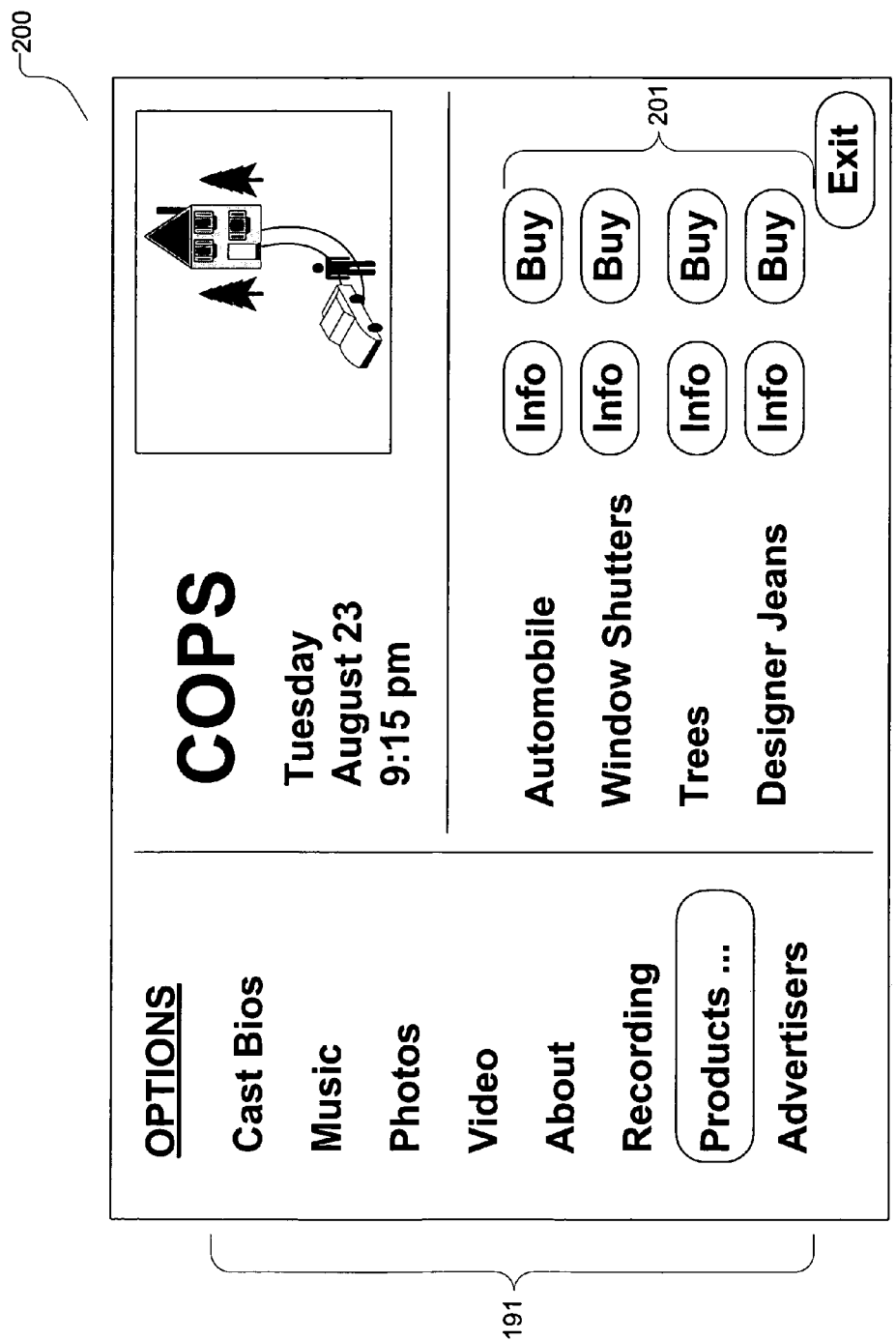
FIG. 10 illustrates an exemplary GUI configured to provide a user with access to information related to one or more products in a flagged scene, according to an embodiment.

In some examples, if the user desires to access information about the products shown in the flagged scene and/or purchase one or more of the products shown in the flagged scene, he or she may select the "products" link under the options menu. FIG. 10 illustrates an exemplary GUI 200 configured to provide a user with access to information related to the products shown in the flagged scene of FIG. 6. As shown in FIG. 10, a number of links 201 may be displayed that enable the user to either access information related to the products shown in the flagged scene or to purchase the products. The "info" and "buy" links shown in FIG. 10 may include links to data already stored on the processing subsystem 110, data stored on the media content provider server 121, and/or data stored at some other location on the network 120.

Figure 11:
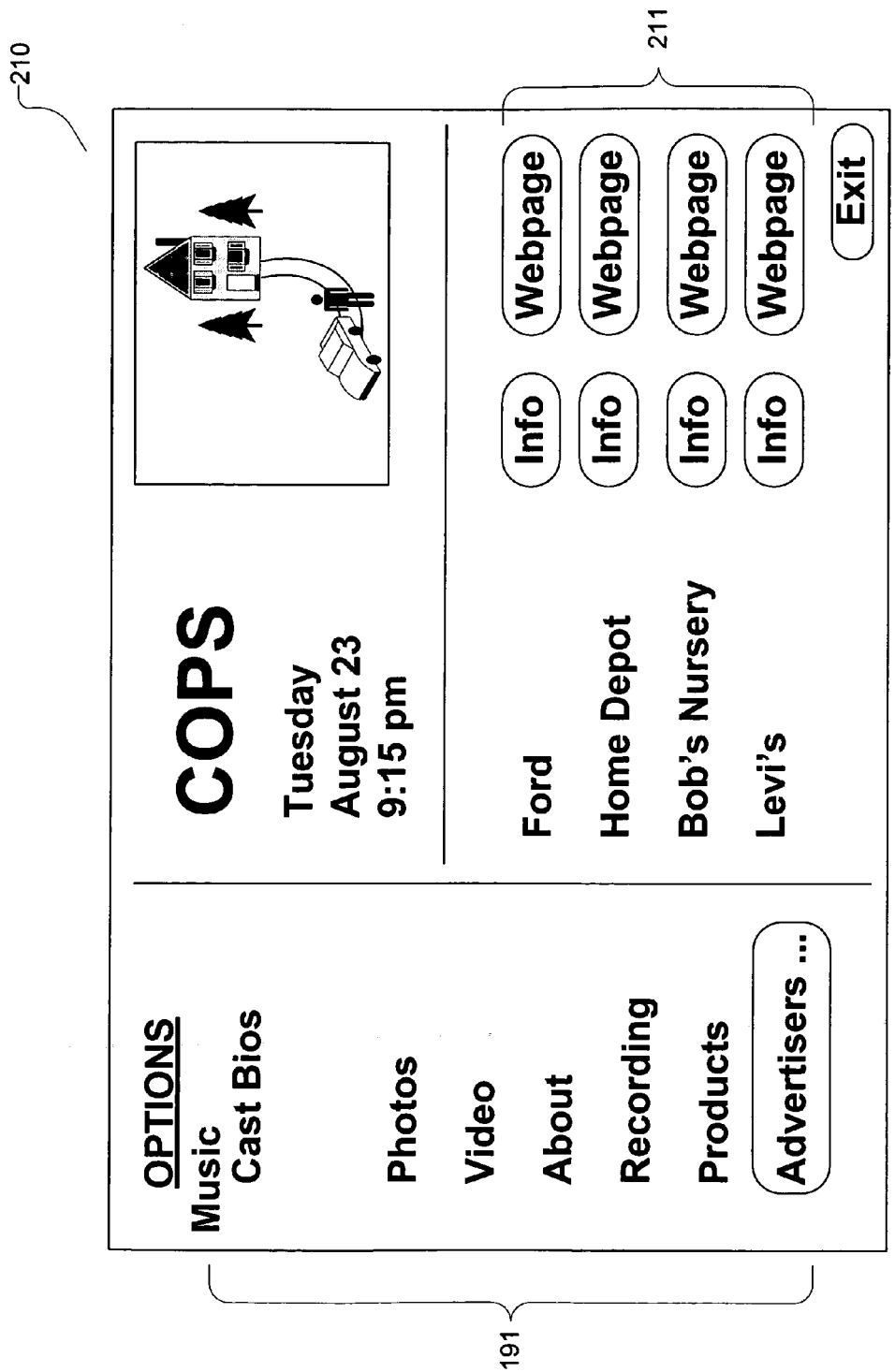
FIG. 11 illustrates an exemplary GUI configured to provide a user with access to additional content related to one or more advertisers, according to an embodiment.

In some examples, as previously mentioned, advertisers or sponsors may pay to have various advertisements included within the additional content associated with a flagged scene. FIG. 11 illustrates an exemplary GUI 210 configured to provide a user with access to additional content related to one or more advertisers. As shown in FIG. 11, links 211 to information related to various advertisers (e.g., Ford®, Home Depot®, Bob's Nursery, and Levi's®) may be included within the GUI 210. This information may include advertisements, links to web pages associated with the advertisers, and/or any other information as may serve a particular application.

Various advertising models may be used to determine the placement of the advertisers in the GUI 210. For example, an advertiser may pay additional money to be displayed as the first sponsor. In addition, advertisers may pay to be included in the additional content corresponding to some or all of the scenes within a media content program. For example, advertisers may pay to be included within the additional content corresponding to scenes having a particular key word.

In some embodiments, the advertisements are only included within a dedicated GUI, such as GUI 210. Alternatively, the advertisements may be included within any of the other GUIs that are displayed on the display device 112.

3. Recording Options

Figure 12:
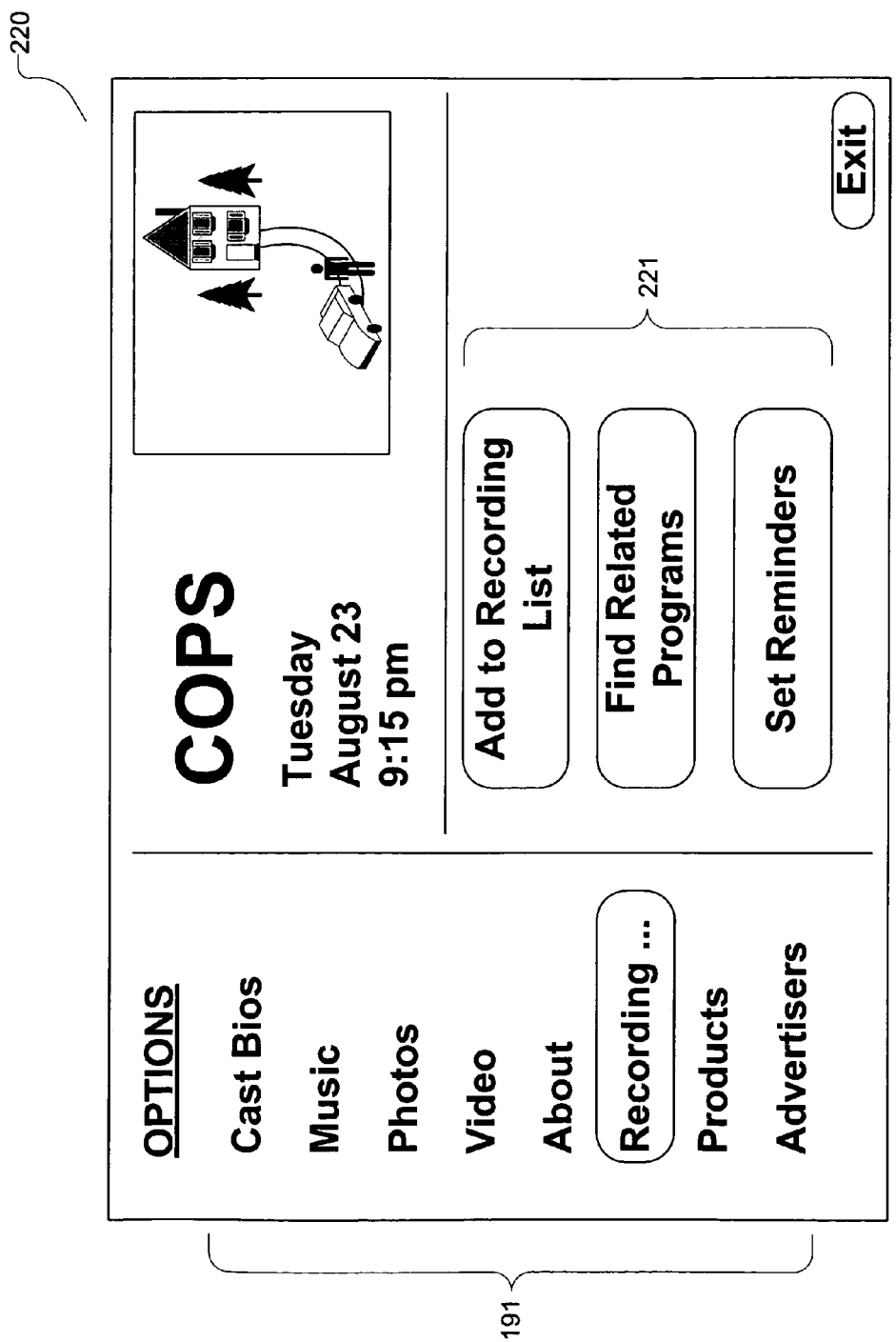
FIG. 12 shows a GUI configured to enable a user to perform various recording tasks associated with a flagged scene, according to an embodiment.

The user may also be presented with various recording options related to the flagged scene. FIG. 12 shows a GUI 220 with links 221 configured to enable the user to perform various recording tasks associated with the flagged scene. For example, the user may add the media content of which the flagged scene is a part to a favorites list containing programs that are automatically recorded by the processing subsystem 110.

The user may also flag a commercial or other type of advertisement for a particular program. By so doing, the user may add the program as a key word record task for the processing subsystem 110 even before program guide data exists for the program.

The user may also find and/or record other programs that are related to the flagged scene. In some examples, the related programs are found by using the key words that are associated with the flagged scene. To this end, the user may add additional key words to the flagged scene so as to locate additional content on the network 120 that has been associated with the same key words by other users.

In some examples, the user may flag a particular scene in an advertisement as a reminder of an upcoming event. For example, if the user flags a scene in an advertisement for an upcoming movie, an email or other reminder may be sent to the user when the movie is released in theatres.

The examples described in connection with FIGS. 9-12 are merely illustrative of the many different options available to the user in connection with a flagged media content scene. It will be recognized that additional or alternative options and GUI formats may be used to give the user access to additional content related to a flagged scene.

E. Sharing

Figure 13:
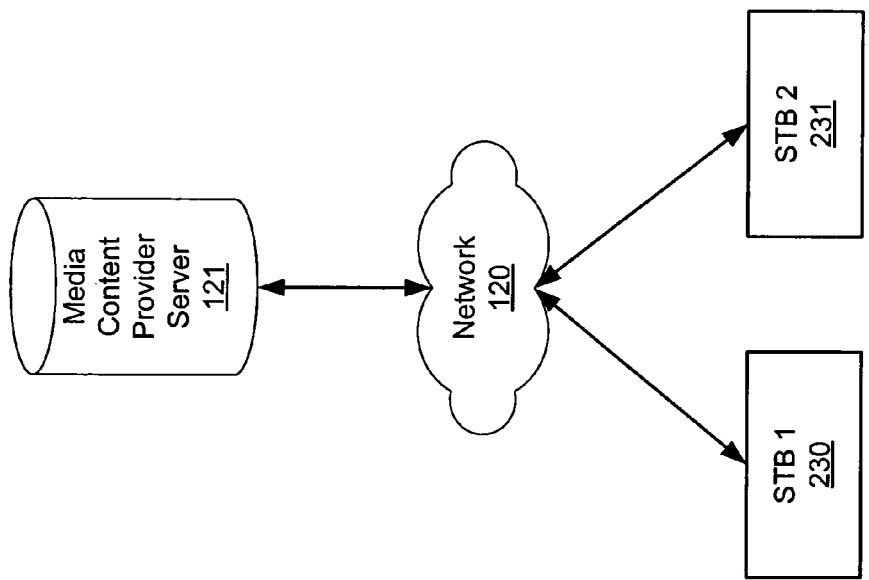
FIG. 13 illustrates an exemplary network configuration wherein multiple STBs are connected to the same network, according to an embodiment.

In some examples, a user may desire to share a flagged scene and/or its corresponding additional content with another user. For example, FIG. 13 shows two STBs 230 and 231 that are connected to the same network 120. The user of the first STB 230 may desire to share a flagged scene and/or its corresponding additional content with the user of the second STB 231. Hence, in some embodiments, each STB may be configured to transmit and receive flagged scenes and their corresponding actionable data modules to and from other STBs or similar devices. In some examples, a received flagged scene is placed in the user's drop box or similar GUI so that the user may access the additional content associated with the received flagged scene.

III. Exemplary Process View

Figure 14:
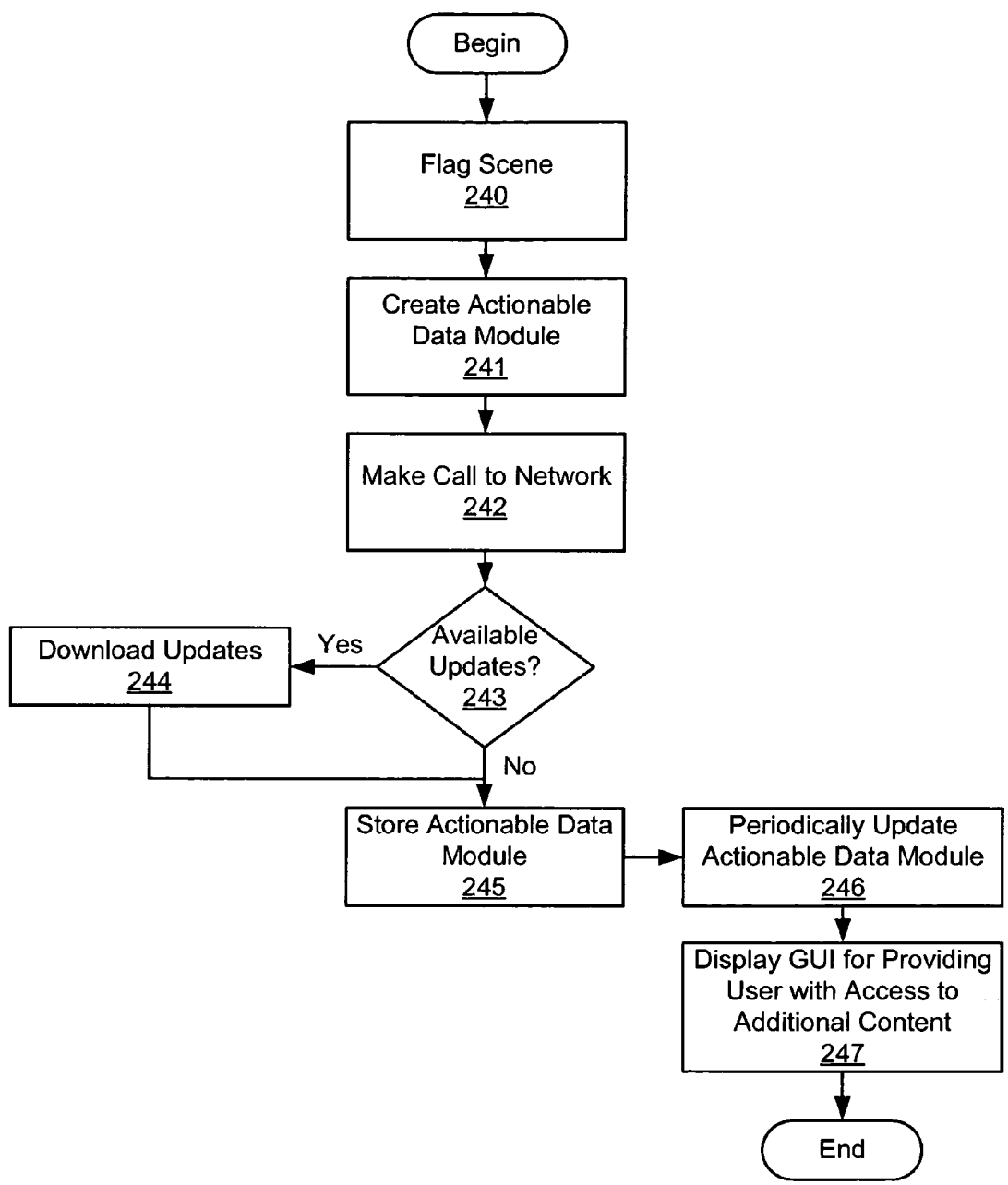
FIG. 14 is a flowchart illustrating an exemplary method of providing access to additional content related to a scene within a media content instance, according to an embodiment.

FIG. 14 illustrates an exemplary method of providing access to additional content related to a scene within a media content instance, according to an embodiment. While FIG. 14 illustrates exemplary steps according to one embodiment, other embodiments may omit, add to, reorder, and/or modify any of the steps shown in FIG. 14.

In step 240, a request to flag a particular media content scene is transmitted to the processing subsystem 110. The flag request may originate from any suitable input device 113. Alternatively, the flag request may originate from an additional access device 114 configured to communicate with the processing subsystem 110.

In step 241, the flag request is processed by the flagging application 143, which creates an actionable data module (e.g., actionable data module 170) corresponding to the flagged media content scene. In certain embodiments, the actionable data module is created with data contained within the media content stream of which the flagged scene is a part. Alternatively, a program ID and/or time code may be transmitted to a remotely located server, which creates the actionable data module and then transmits the data module back to the processing subsystem 110. However, for illustrative purposes only, it will be assumed that the actionable data module is created by an application residing within the processing subsystem 110.

A call to the network 120 may then be made to update the contents of the actionable data module, as shown in step 242. In certain embodiments, the actionable data module is updated with content stored on the media content provider server 121. However, it will be recognized that the actionable data module may be updated with content stored at any location within the network 120.

If any updates to the actionable data module are available on the network 120 or on the media content provider server 121 (Yes; step 243), the updates are downloaded to the processing subsystem 110 and included in the actionable data module, as shown in step 244.

In step 245, the actionable data module is stored within the processing subsystem 110. The actionable data module may then be accessed by a user when the user desires to view additional content associated with the flagged scene.

As shown in step 246, the actionable data module may be periodically updated with new content that becomes available on the network 120 or media content provider server 121. In this manner, the actionable data module may always include up-to-date data.

In step 247, one or more GUIs may be displayed by the display device 112 to provide a user with access to the additional content contained within or referenced by the actionable data module.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
a media content processing subsystem configured to:
receive media content through a network from a media content provider;
provide the media content to a viewer;
process a flagging request from the viewer, said flagging request designating a scene within a media content instance of the media content as a flagged scene; and
generate an indicator to be temporarily displayed as an overlay on said flagged scene on a display device in communication with said media content processing subsystem indicating that said scene has been flagged;
automatically generate an actionable data module corresponding to said flagged scene in response to said flagging request;
wherein said actionable data module comprises:
a media content identifier;
date and time of said flagged scene; and
additional content corresponding to said flagged scene, said additional content including at least one of an outtake, an alternative program ending, a director's cut, a commercial for a product shown in said flagged scene, a cast photograph;
wherein said additional content is included with said media content received from the media content provider.

2. The system of claim 1, wherein said media content processing subsystem is further configured to update said actionable data module with data located on said network; and wherein the updating includes requesting from and receiving from said network updated additional content corresponding to said flagged scene.

3. The system of claim 2, wherein said additional content comprises one or more links to content located on said network.

4. The system of claim 1, further comprising:
the media content provider configured to provide said media content processing subsystem with a data stream comprising said media content instance of the media content;
wherein said additional content is at least in part derived from said data stream substantially simultaneously with said scene being flagged from said media content instance of the media content in said data stream.

5. The system of claim 1, wherein said media content processing subsystem comprises a storage device, and wherein said additional content comprises one or more links to content stored within said storage device.

6. The system of claim 1, wherein said media content processing subsystem comprises at least one of a set-top box, home communication terminal, digital home communication terminal, stand-alone personal video recorder, digital video disc player, video-enabled phone, and personal computer.

7. The system of claim 1, wherein said media content instance comprises at least one of a television program, pay-per-view content, video-on-demand content, Internet content, digital video disc content, and audio programming content.

8. The system of claim 1, wherein said additional content comprises at least one of descriptive information corresponding to said media content instance, purchasing options corresponding to one or more of said products displayed in said flagged scene, one or more links to web content, recording options, and one or more key words corresponding to said flagged scene.

9. The system of claim 1, wherein said media content processing subsystem is further configured to generate one or more graphical user interfaces configured to provide a user with access to said additional content corresponding to said flagged scene.

10. The system of claim 1, further comprising:
a user input device configured to communicate with said media content processing subsystem;
wherein said user input device is configured to generate said flagging request.

11. The system of claim 1, further comprising:
one or more access devices configured to communicate with said media content processing subsystem;
wherein said access devices are configured to access said additional content corresponding to said flagged scene.

12. The system of claim 1, wherein said media content processing subsystem is further configured to customize one or more options available to a user of said media content processing subsystem, wherein said customization is based on said actionable data module.

13. An apparatus comprising:
a storage device; and
a processor communicatively coupled to said storage device, said processor configured to
receive a media content instance through a network from a media content provider;
process a flagging request received from a viewer while viewing the media content instance, said flagging request designating a scene within the media content instance as a flagged scene;
generate an indicator to be temporarily displayed as an overlay on said flagged scene on a display device in communication with said media content processing subsystem indicating that said scene has been flagged;
automatically generate an actionable data module corresponding to said flagged scene in response to said flagging request; and
store said actionable data module within said storage device;
wherein said actionable data module comprises:
a media content identifier;
date and time of said flagged scene; and
additional content corresponding to said flagged scene, said additional content including at least one of an outtake, an alternative program ending, a director's cut, a commercial for a product shown in said flagged scene, a cast photograph, and advertiser information;
wherein said additional content is included with said media content received from the media content provider.

14. The apparatus of claim 13, wherein said processor is further configured to update said actionable data module with data located on said network; and wherein the updating includes requesting from and receiving from said network updated additional content corresponding to said flagged scene.

15. The system of claim 1, wherein said media content processing subsystem is further configured to receive at least one key word into the actionable data module, and at least one of provide access to additional content associated with said at least one key word, provide a link to users who flag media content having said at least one key word, and automatically record other media content having said at least one key word.

16. The system of claim 2, wherein said updated additional content is pinged for latency, and any content that has a latency that does not meet predefined transmission standards of said network is excluded from the updated additional content.

17. The apparatus of claim 13, further comprising:
a receiving device configured to receive a data stream comprising said media content instance;
wherein said additional content is at least in part derived from said data stream substantially simultaneously with said scene being flagged from said media content instance of the media content in said data stream.

18. The apparatus of claim 13, wherein said additional content comprises one or more links to content stored within said storage device.

19. The apparatus of claim 13, wherein said additional content comprises at least one of descriptive information corresponding to said media content instance, purchasing options corresponding to one or more of said products displayed in said flagged scene, one or more links to web content, recording options, and one or more key words corresponding to said flagged scene.

20. The apparatus of claim 13, further comprising a graphics engine, wherein said graphics engine is configured to generate one or more graphical user interfaces configured to provide a user with access to said additional content corresponding to said flagged scene.

21. A method comprising:
receiving a media content instance through a network from a media content provider;
receiving from a viewer of the media content instance a flagging request, said flagging request designating a scene within the media content instance as a flagged scene;
processing said flagging request; and
generating an indicator to be temporarily displayed as an overlay on said flagged scene on a display device in communication with said media content processing subsystem indicating that said scene has been flagged;
automatically generating, in a media content processing subsystem, an actionable data module corresponding to said flagged scene in response to said flagging request;
wherein said actionable data module comprises:
a media content identifier;
date and time of said flagged scene; and
additional content corresponding to said flagged scene, said additional content including at least one of an outtake, an alternative program ending, a director's cut, a commercial for a product shown in said flagged scene, a cast photograph, and advertiser information;
wherein said additional content is included with said media content received from the media content provider.

22. The method of claim 21, further comprising updating said actionable data module with data located on a network; and wherein the updating includes requesting from and receiving from said network updated additional content corresponding to said flagged scene.

23. The method of claim 22, wherein said additional content comprises one or more links to content located on said network.

24. The method of claim 21, wherein said additional content comprises at least one of descriptive information corresponding to said media content instance, purchasing options corresponding to one or more of said products displayed in said flagged scene, one or more links to web content, recording options, and one or more key words corresponding to said flagged scene.

25. The method of claim 21, further comprising generating one or more graphical user interfaces configured to provide a user with access to said additional content corresponding to said flagged scene.

* * * * *